United States Patent [19]
Van Beers et al.

[11] Patent Number: 6,083,333
[45] Date of Patent: Jul. 4, 2000

[54] SELF LEVELING WELD FIXTURE

[75] Inventors: Franciscus Cornelis Van Beers, Trabuco Canyon; Terry Lee Adams, Huntington Beach, both of Calif.

[73] Assignee: ITT Manufacturing Enterprises, Inc., Wilmington, Del.

[21] Appl. No.: 09/174,073

[22] Filed: Oct. 16, 1998

[51] Int. Cl.[7] .............................. B32B 31/00; B23Q 1/25
[52] U.S. Cl. .................. 156/73.1; 156/580.2; 156/391; 269/75; 248/346.05; 29/559
[58] Field of Search .................... 156/391, 73.1, 156/580.1, 580.2, 581; 248/180.1, 188.2, 188.3, 346.03, 346.05, 560, 580, 678; 269/75; 29/559

[56] References Cited

U.S. PATENT DOCUMENTS

| | | | |
|---|---|---|---|
| 3,661,661 | 5/1972 | Berleyoung | 156/580 |
| 4,491,306 | 1/1985 | Eickhorst | 269/21 |
| 4,934,671 | 6/1990 | Laninga | 269/20 |
| 6,012,711 | 1/2000 | Cipolla | 269/21 |
| 6,019,154 | 2/2000 | Ma et al. | 156/580 |

*Primary Examiner*—Richard Crispino
*Assistant Examiner*—Sue A. Purvis
*Attorney, Agent, or Firm*—Thomas L. Peterson

[57] ABSTRACT

A welding fixture (30) can hold a part (12) that is to be welded by a weld head (22) that has a flat head surface (32) that must press against a flat part surface (56), where the fixture automatically tilts to assure that the surfaces lie coplanar so the fixture can be fixed in that position. The fixture has upper and lower assemblies (60, 62) that respectively include upper and lower washers (84, 92) with mating spherical surfaces (96, 98) that allow the upper assembly to pivot about horizontal axes with respect to the lower assembly. The washers have central holes (102, 104), and a bolt (112) extending through the central holes can be tightened to clamp the upper and lower assemblies together after the upper assembly has been tilted to the desired orientation. The spherical surfaces are preferably centered on a sphere center (100) that lies above the fixture, with the spherical surfaces subtending an angle (C) of no more than about 60° with respect to the sphere center.

12 Claims, 3 Drawing Sheets

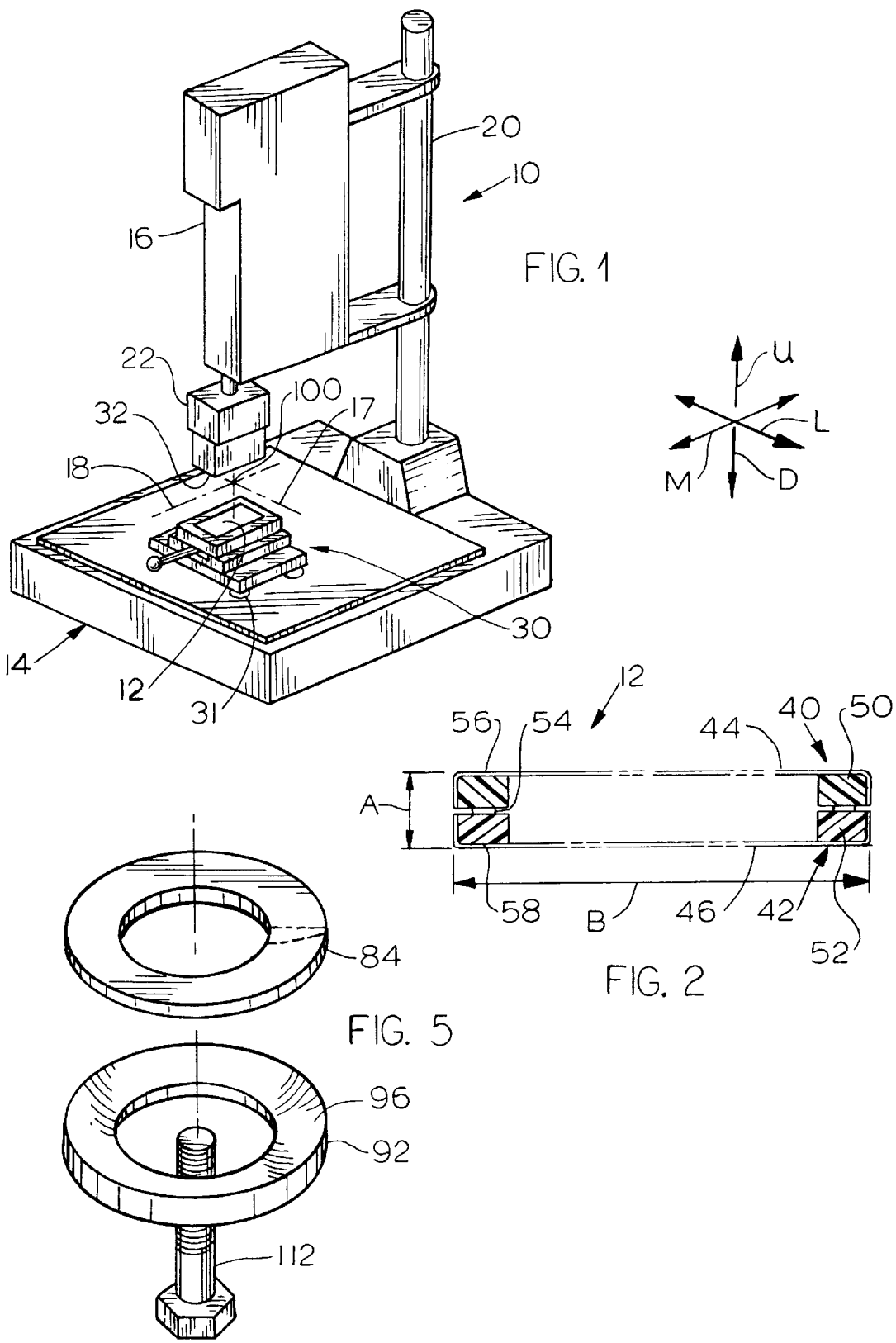

us 6,083,333

SELF LEVELING WELD FIXTURE

BACKGROUND OF THE INVENTION

Plastic parts are commonly welded by pressing the lower face of a horn or head against an upper surface of the part, to transmit sonic energy that welds adjacent surfaces of the parts. The lower surface of the head and the upper surface of the part must contact one another along all areas of the part, which generally requires the head and part surfaces to be precisely coplanar. The head is moveable up and down on a welding machine over a base of the machine. Although the lower surface of the head is approximately parallel to the upper surface of the base, they may be out of alignment by more than 1°. The head and part surfaces commonly must be coplanar within an angle on the order of magnitude of 1/10th degree.

The part-holding part of the fixture may be tilted slightly by a mechanism that includes a ball that supports the upper assembly of the fixture on the lower one. When the upper assembly is in the precise orientation required, several bolts that lie around the ball and that connect the upper and lower assemblies, are tightened. This is a time consuming procedure that often leads to inaccuracies. A fixture that enables the upper assembly of the fixture to be readily tilted to the proper orientation and then easily locked in place, would be desirable.

SUMMARY OF THE INVENTION

In accordance with one embodiment of the present invention, a welding fixture is provided for holding a part to be welded when a head is moved down against it, which enables automatic tilting to the proper orientation and rapid and accurate locking in that orientation. The upper and lower assemblies of the fixture have substantially spherical mating surfaces that lie one on the other. At least one fastener extends between the lower and upper assembly and can be tightened to move them together so as to clamp the spherical surfaces together by pressing them firmly against each other. The spherical surfaces are preferably curved about a spherical center lying above the fixture and the spherical surfaces preferably subtend an included angle of no more than about 60° about the spherical center, with a large radius of coverture.

The spherical surfaces have holes at their centers, and a fastener extends through the holes between the lower and upper assemblies. The fastener can be in the form of a bolt with a head that presses against one of the assemblies through a pair of washers that, themselves, have mating spherical surfaces.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view showing a fixture of the present invention, shown mounted on a welding machine, with a welding head being spaced above the fixture.

FIG. 2 is a sectional view of a part that fits on the fixture of FIG. 1, showing the areas that are to be welded.

FIG. 5 is an exploded isometric view of the spherical washers of the fixture of FIG. 4.

DESCRIPTION OF THE PREFERRED EMBODIMENTS

Figure 3:
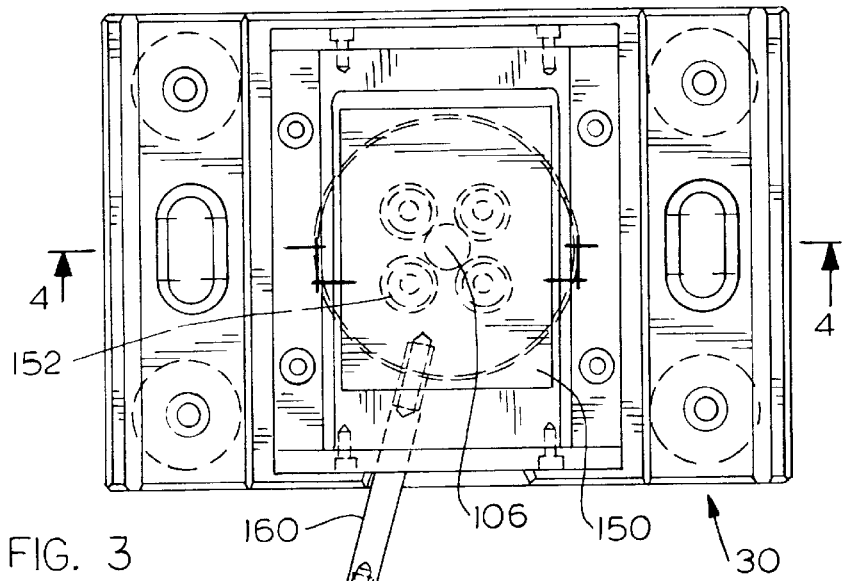
FIG. 3 is a plan view of the fixture of FIG. 1.

FIG. 1 illustrates a welding machine 10 which is used to weld parts 12 by sonic welding. The machine includes a machine base 14 which is stationary, a weld assembly 16 that can be fixed at a selected position along a post 20, and a weld head 22 that can be moved down D and back up U again either manually or automatically. The parts 12 to be welded are mounted on a fixture 30 with feet 31 that rest on the base. The fixture can be moved on the base 14, until the position of the part 12 is directly under the head 22. In addition, it is necessary that the flat head surface 32 be precisely coplanar with a flat upper surface of the part that is to be welded. The fixture enables pivoting of a part-holding nest 70 about perpendicular horizontal axes 17, 18 that extend in lateral and longitudinal directions L, M.

FIG. 2 shows one part 12 that must be welded, which includes upper and lower halves 40, 42 of a frame of a PC card or flash memory card. The card has a thickness A at its sides of 3.3 mm±0.1 mm, and has a width B of 54 mm. Each half of the card includes a sheet metal cover part 44, 46 that extends around plastic strips 50, 52 that lie at opposite sides of the card. The lower plastic strip is formed with projections 54 that are melted during sonic welding, to weld the strips together. Such sonic welding is achieved by pressing the head surface of the weld head against a flat upper surface 56 of the card, the upper surface 56 to be depressed extending along a narrow band at either side of the top of the card. Since the thicknesses of the opposite sides of the card must each be 3.3 mm±0.1 mm, the upper surface 56 must lie in a plane that is parallel to the plane of a lower surface 58 of the card with a precision of about 1/10th degree.

Figure 4:
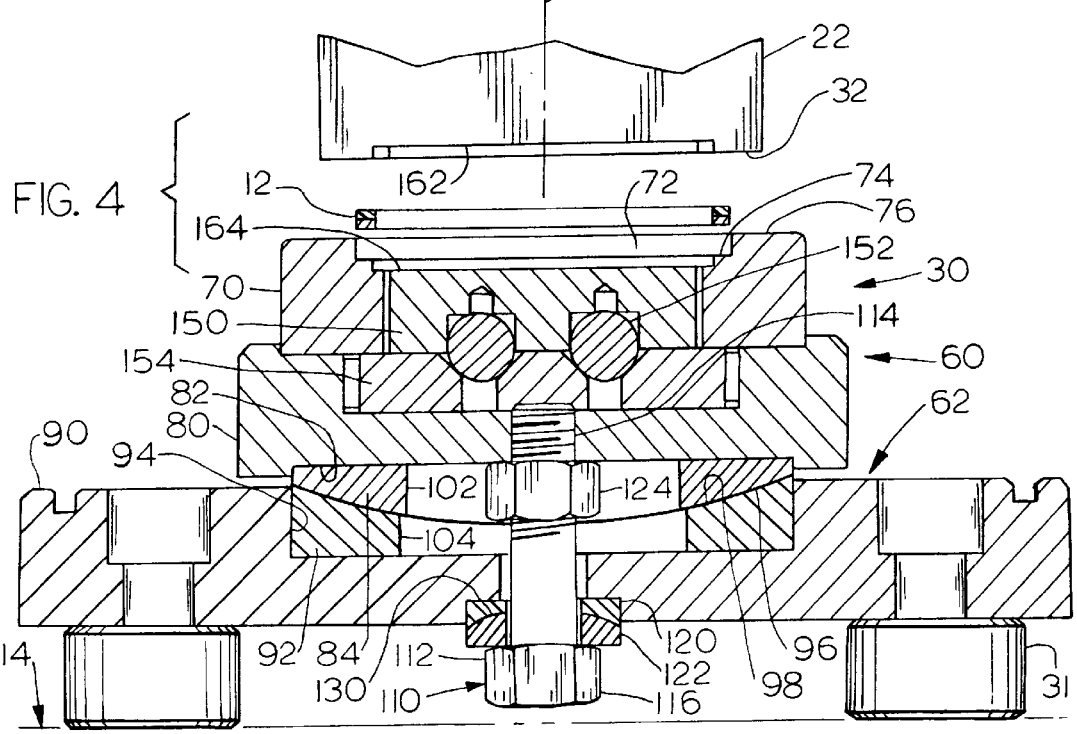
FIG. 4 is an exploded view showing a weld head, a part to be welded, and the fixture of FIG. 3 as taken on line 4—4 thereof.

FIG. 4 shows details of the fixture 30 which can hold the part 12 that is to be welded when the head surface 32 moves down against the part. The fixture includes an upper nest assembly 60 and a lower base assembly 62. The upper nest assembly has a nest 70 with a recess 72 that is shaped to precisely hold the part 12 to be welded. The recess has a flat support wall 74 that supports the part, and has a flat top nest surface, or alignment surface 76, that lies in a plane that is precisely parallel to the plane of the support wall 74. The nest 70 lies on a nest plate 80 that has a downwardly-opening recess 82 that holds a top spherical washer 84. The lower base assembly 62 includes a base plate 90 and a bottom spherical washer 92 held in an upwardly-opening recess 94 of the base plate. The upper and lower assemblies 60, 62 are supported on one another through the washers 84, 92. The washers form upper and lower substantially spherical mating surfaces 96, 98 that are curved about a spherical center 100 that lies above the fixture. The spherical washers have center holes 102, 104 centered on an axis 106 of the fixture. A fastener 110 extends through the center holes. The fastener has lower and upper ends coupled respectively to the lower and upper assemblies 62, 60.

The spherical washers 84, 92 enable the part supporting wall 74 and the top surface 76 of the nest to be tilted slightly so they lie in planes that are precisely parallel to the plane of the head surface 32 of the horn or welding head 22. With the fastener 110 loosened, the head 22 is lowered until it presses against the top surface 76 of the nest. If any side of the top surface 76 is raised, that side will be pushed down, so the flat surfaces 32, 76 will become precisely coplanar. With the head 22 pressed down, the fastener 110 is tightened, to clamp the washers 84, 92 tightly together. The head 22 is then lifted, a part 12 is placed in the recess 72, and the head 22 is lowered again, with sonic energy transmitted through the head 22 to the part 12 to weld it.

Figure 7:
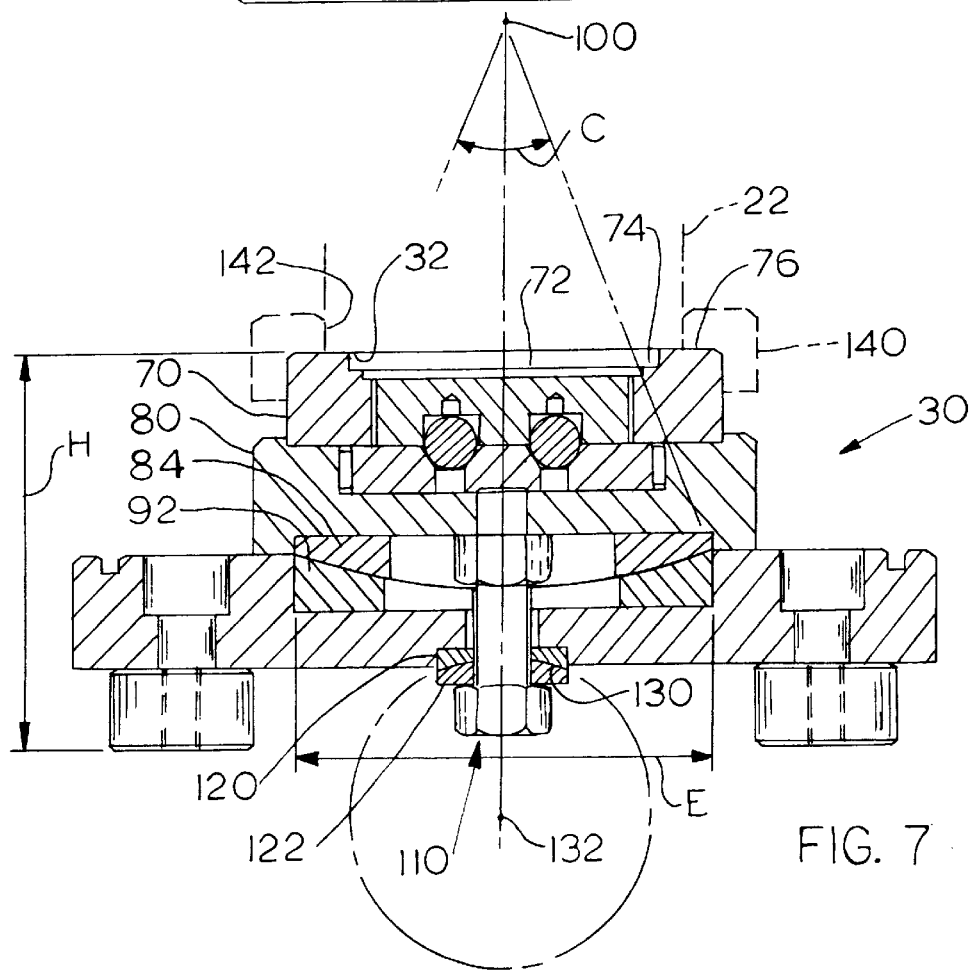
FIG. 7 is a sectional view showing the fixture of FIG. 4, with the alignment tool of FIG. 6 shown in phantom lines mounted thereon, and with the welding head shown being used to position the fixture.

The fastener 110 includes a threaded stud 112 whose upper end 114 is threadably engaged with the nest plate 80, and whose lower end holds a nut 116. When the nut 116 is turned to tighten it, it presses upward through a pair of fastener washers 120, 122 against the face plate 90 to push the spherical washers 84, 92 tightly together. A lock nut 124 holds the stud. The fastener washers 120, 122 have engaged spherical surfaces at 130 that permit the bolt head 116 to pivot as the top spherical washer pivots on the lower one. FIG. 7 shows that the mating spherical surfaces 130 of the fastener washers 120, 122 are curved about a center point 132 that is spaced below the surfaces 130 by about the distance between the surfaces 130 and the location where the bolt engages the nest plate 80.

The large spherical washers 84, 92 subtend an angle C of about 45° about the sphere center 100. As a result, the entire spherical surfaces 96, 98 extend primarily horizontally to withstand the clamping forces applied by the fastener 110. The angle C is preferably less than 90°, since an angle of more than 90° would result in portions being primarily vertical, which are inefficient for withstanding clamping forces and yet which can prevent proper operation if not precisely spherical. Applicant prefers that the included angle C be no more than about 60°. The radius of curvature of the spherical surfaces 96, 98 should be more than half the height H of the fixture and preferably more than the height of the fixture to provide spherical surfaces 96, 98 of a large diameter E in a small included angle C, to provide large surface areas to withstand the clamping forces. The spherical surfaces 96, 98 are preferably lapped to enable fine adjustment, but are preferably not lubricated to avoid movement when clamped. The washer spherical surfaces 120, 122 are preferably lubricated. It would be possible to have the head of the bolt uppermost and to have the bolt threadably engaged with the lower assembly, but then it would be difficult to provide access for the head to turn the bolt.

Applicant prefers to form the spherical fixture-tilt surfaces 96, 98 on separate washers, instead of on the nest plate 60 and on the base plate 90. The washers can be made at moderate cost because they are of simple shape and the only precision surfaces are the spherical surfaces.

Figure 6:
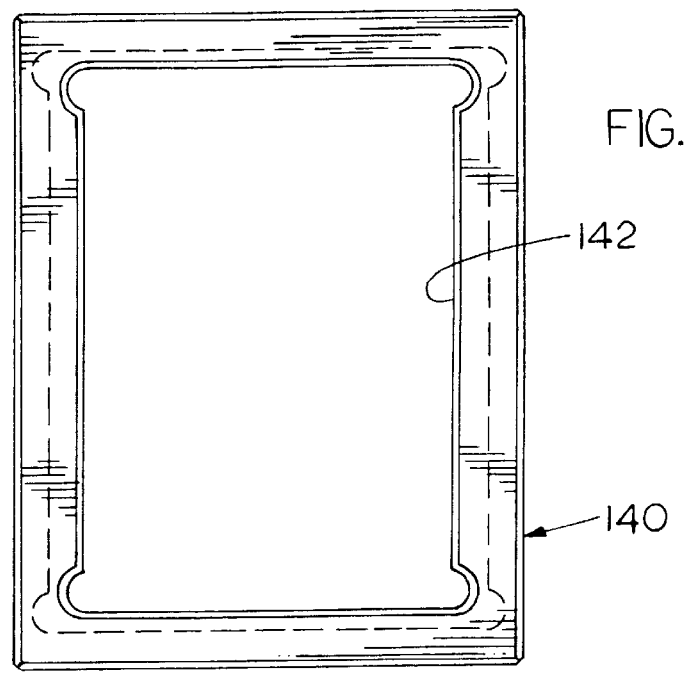
FIG. 6 is a plan view of an alignment tool that can be mounted on the fixture of FIG. 4.

FIG. 6 shows an alignment tool 140, which is used as shown in FIG. 7, to align the fixture 30 with the welding head 22. With the alignment tool 140 mounted as illustrated, the welding head 22 is lowered, and the fixture 30 is shifted horizontally on the base 14 until the head 22 fits into an opening 142 of the alignment tool. The fixture is then fixed in position on the base 14 of the welding machine. The alignment tool is then removed and parts can be placed in the recess 72 for welding.

FIGS. 3 and 4 show that the fixture 30 is of a type that includes an ejector 150 that receives balls 152 that also fit into recesses in a pivot plate 154. When a handle 160 is pivoted about the axis 106, it pivots the plate 154, which pushes the balls up, to lift the ejector 150 and thereby move up parts 12 that were in the recess 72 and that have been welded. It should be noted that the only flat planar faces that must be brought precisely parallel to each other, are the face 32 that lies along the periphery of the welding head 22 and the part support surface 74. The bottom of the weld head has a recess at 162. Similarly, the part-holding recess 72 has a depression at 164, and it is only the limited peripheral area at 74 and at 76 which must be maintained in planes parallel to the plane of the head plane 32.

Thus, the invention provides a welding fixture for holding parts to be welded, so upper flat surfaces of the parts are maintained precisely parallel to the lower welding surface of the weld head. The fixture includes upper and lower assemblies that are supported on one another through spherical surfaces. Holes at the centers of the spherical surfaces enable a fastener to be passed through the holes between the lower and upper assemblies, so the fastener can be tightened to clamp the assemblies together by clamping of the spherical surfaces to each other. The spherical surfaces are preferably formed on large washers that are received in recesses. The spherical surfaces preferably have a large radius of coverture to provide large diameter surfaces that face primarily vertically. While the apparatus is shown with the weld head moving up and down, the system can be used with the weld head moving in other directions.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A welding fixture for lying on a base and for holding parts that have upper surfaces that lie in a plane and that are to be pressed down by a head surface of a welding head that moves downward with respect to the base, where said fixture is constructed for adjusting the orientation of the parts about horizontal axes so said upper surfaces can be oriented precisely coplanar with said head surface, comprising:

lower and upper fixture assemblies, said lower assembly having a lower surface for resting on said base, and said upper assembly constructed to hold said part, with said upper assembly being pivotable about said horizontal axes on said lower assembly;

said upper and lower assemblies having substantially spherical mating surfaces that lie one on the other;

at least one fastener that extends between said lower and upper assemblies and that can be tightened to clamp said substantially spherical surfaces together by pressing them firmly against each other.

2. The welding fixture described in claim 1 wherein:

said upper assembly has a part-supporting surface, and said fixture has a vertical thickness;

at least one of said substantially spherical surfaces has a radius of curvature that is at least half the vertical thickness of said fixture.

3. The fixture described in claim 1 wherein:

said substantially spherical surfaces are curved about a sphere center point, by an angle of no more than 90°.

4. The fixture described in claim 3 wherein:

said spherical center point lies above said fixture.

5. The welding fixture described in claim 1 wherein:

said substantially spherical surfaces each having a center and a center hole at the center;

said fastener extends through said center holes and has opposite ends coupled to said lower and upper assemblies, said fastener being loosenable to allow said upper assembly to tilt by sliding of said spherical surfaces on each other, and when said fastener is tightened, to clamp said spherical surfaces together to prevent said upper assembly from tilting relative to said lower assembly.

6. The welding fixture described in claim 5 wherein:

said lower assembly includes a base plate with an upwardly-opening recess and a washer lying in said recess and forming the spherical surface of said lower assembly;

said upper assembly includes a nest plate with a downwardly-opening recess, and a washer lying in said downwardly-opening recess and forming the spherical surface of said upper assembly.

7. Apparatus for use with a welder that has a machine base, and that has an upper welder part that can hold a weld head and move it down to apply welding energy to a part that is to be welded, comprising;

a part-holding fixture that includes lower and upper assemblies, said lower assembly having a lower surface for resting on said machine base and said upper assembly having a recess for holding said part;

said upper and lower assemblies having substantially spherical mating surfaces that lie one on the other;

said substantially spherical surfaces each having a center and a center hole at the center;

a fastener that extends through said center holes and that has opposite ends coupled to said lower and upper assemblies, said fastener being loosenable to allow said upper fixture to tilt by sliding of said spherical surfaces on each other and being tightenable to clamp said spherical surfaces together to prevent said upper fixture from tilting relative to said lower fixtures.

8. The apparatus described in claim 7 wherein:

said fixture has a height and at least one of said substantially spherical surfaces has an outside diameter that is at least half of the height of said fixture and that has a radius of curvature that is at least about the height of said fixture.

9. The apparatus described in claim 7 wherein:

said fastener includes a bolt with a lower end forming a bolt head, and a pair of bolt washers lying between said bolt head and said lower assembly;

said bolt washers have spherical washer surfaces that engage each other.

10. The apparatus described in claim 7 wherein:

said spherical surfaces are curved about a sphere center that lies above said fixture.

11. A method for holding parts that are to be welded by pressing a flat weld surface of a weld head against a part that lies in a fixture, comprising:

pressing the weld head flat surface down against a flat alignment surface on an upper assembly of the fixture while the upper assembly is supported on a lower assembly of the fixture by a pair of spherical surfaces connected respectively to said upper and lower assemblies, and allowing said upper assembly to pivot about horizontal axes until said alignment surface lies coplanar with said weld head surface;

tightening a fastener that extends through center holes of said spherical surfaces to draw said upper and lower assemblies together to clamp said spherical surfaces together.

12. The method described in claim 11 wherein:

said step of allowing said upper assembly to tilt includes tilting said upper assembly about axes that lie above said fixture.

* * * * *